3,649,575
STABLE PREPARATIONS FOR FINISHING WOOL

Rosemarie Toepfl, Basel, Heinz Abel, Reinach, Arthur Maeder, Therwil, and Alberto Deflorin, Riehen, Switzerland, assignors to Ciba Limited, Basel, Switzerland
No Drawing. Filed Apr. 1, 1970, Ser. No. 24,889
Claims priority, application Switzerland, Apr. 10, 1969, 5,565/69
Int. Cl. C08g 45/10; D06m 3/02
U.S. Cl. 260—21                  11 Claims

ABSTRACT OF THE DISCLOSURE

A stable preparation of reaction products is provided, which is prepared by reacting a basic polyamide with a reaction product of an epoxide and an aminoplast precondensate, an at least dihydric alcohol, a dicarboxylic acid or an anhydride of a dicarboxylic acid. The polyamides are made from polymeric unsaturated fatty acids and polyalkylene polyamines. The equivalent ratio of the amino groups of the polyamide to the epoxide groups of the epoxide reaction product is 1:1 to 5:1. The pH-value of the preparation is from 2 to 8. The resulting preparations are useful in the textile industry e.g. for rendering wool non-felting. Especially suitable are the preparations when applied in combination with a dyeing process.

---

The subject of the invention is a process for finishing wool, preferably for rendering it non-felting, characterised in that the wool is treated with preparations which contain a reaction product of (a) basic polyamides which are obtained by condensation of (a') polymeric, preferably dimeric to trimeric, unsaturated fatty acids and (b') polyalkylenepolyamines, with (b) reaction products of (a") 1.5 to 6 mols of an epoxide which contains at least 2 epoxide groups per molecule and (b") 1 mol of an aminoplast precondensate containing alkyl-ether groups, an aliphatic or aromatic, at least dihydric, alcohol or an aliphatic or aromatic dicarboxylic acid or an anhydride of an aliphatic or aromatic dicarboxylic acid, with the equivalent ratio of the amino groups of component (a) to the epoxide groups of component (b) being 1:1 to 5:1 and with the pH-value of the reaction mixture of components (a) and (b) being adjusted to a value of 2 to 8 not later than after completion of the reaction, and that the wool is dried after the treatment.

Possible polymeric unsaturated fatty acids for the manufacture of the basic polyamides (=component a) are above all dimerized to trimerized linoleic or linolenic acid. The polyamides are obtained by condensation with polyamines, especially aliphatic polyamines such as diethylenetriamine, triethylenetetramine or tetraethylenepentamine, that is to say amines of formula (1)  

wherein $n$ is 1, 2 or 3 and can, in the case of mixtures, also assume a non-integral average value, for example between 1 and 2. These polyamides must be basic, and this is achieved by employing an excess of amino groups ($H_2N-$ and alkylene-NH-alkylene) in comparison to the carboxylic acid groups during the polyamide condensation.

Preferably, use is made as component (b) of a reaction product in the manufacture of which epoxides of bisphenols were used as starting component (a").

In particular, reaction products of bisphenols with epihalogenohydrins, such as for example the reaction product of 2,2-bis-(4'-hydroxyphenyl)-propane with epichlorhydrin, have here proved advantageous.

Further possibilities are however, also diglycidyl ethers such as for example ethylene glycol diglycidyl ether, hexahydrophthalic acid diglycidyl ether or butanediol diglycidyl ether. Cycloaliphatic diepoxides are also suitable.

Suitable components (b") for the manufacture of the reaction products (b) are above all alkyl ethers of methylolaminotriazines, polyethylene glycols, polyalkanols, bisphenols or benzenedicarboxylic acid anhydrides. Alkyl ethers of highly methylolated melamine, of which the alkyl radicals contain at most 4 carbon atoms, for example dibutyl and tributyl ethers of hexamethylolmelamine, are of particular interest as component (b"). In addition, however, compounds such as polyethylene glycol, ethylene glycol, diethylene glycol, glycerine, pentaerythritol, phthalic anhydride or 2,2-bis-(4'-hydroxyphenyl)-propane are possible as component (b").

In addition to the components (a) and (b) the reaction products can also further be synthesized from an additional third component (c), namely monofunctional compounds which possess a mobile halogen atom, or a vinyl, acid, ester, acid halide, acid anhydride, nitrile, isocyanate or epoxide group as functional groups or atoms.

Appropriately, the equivalent ratio of the amino groups of the component (a) to the functional groups or atoms of the monofunctional component (c) is then 4:3 to 20:1, the equivalent ratio of the amino groups of component (a) to the epoxide groups of the polyfunctional component (b) 5:1 to 10:9, and the equivalent ratio of the amino groups of the component (a) to the epoxide groups or functional groups or atoms of components (b) and (c) at least 1:1. Preferably, the equivalent ratio of the amino groups of component (a) to the epoxide groups or functional groups or atoms of components (b) and (c) is at least 4:3. These monofunctional compounds [=component (c)] are preferably aryl or aralkyl halides, nitriles or amides of acids of the acrylic acid series, aliphatic or aromatic carboxylic acids, their esters, halides and anhydrides, aliphatic and aromatic sulphonic acids, their halides and anhydrides, as well as aliphatic or aromatic isocyanates or epoxides.

Advantageously, the following are employed as monofunctional components (c): alkyl halides such as ethyl bromide or butyl chloride, aralkyl halides such as benzyl chloride; nitriles or amides of acrylic or methacrylic acid such as acrylonitrile or acrylic acid amide; alkanecarboxylic acids with up to 18 carbon atoms, such as coconut fatty acid or stearic acid, or their esters with alkanols which contain at most 5 carbon atoms, for example methanol, ethanol or n-butanol, or their halides or anhydrides such as acetyl chloride, acetic anhydride or n-butylrolactone; aliphatic or aromatic sulphonic acids, their halides and anhydrides such as p-toluenesulphonic acid, p-toluenesulphonic acid chloride, propanesultone or butanesultone, aromatic isocyanates such as phenylisocyanate or aliphatic or aromatic epoxides such as ethylene oxide, propylene oxide, butylene oxide, dodecene oxide or styrene oxide.

Particularly suitable components (c) are alkylene oxides with at most 12 carbon atoms, alkanecarboxylic acids with at most 18 carbon atoms, monocyclic aralkyl halides or acrylonitrile.

In the case of the conjoint use of a monofunctional component (c) the sequence in which the reaction of the polyamides (a) with the components (b) and (c) is effected is of subordinate importance. It is possible first to react the polyamides with a monofunctional compound and then with the reaction product (b), or also conversely. In some cases, that is to say if there are no great differences in reactivity, the reaction can also be effected simultaneously.

Preferably, the reaction of the components (a), (b) and optionally (c) is in general effected by initially introducing the basic polyamide and, where appropriate, slowly introducing the monofunctional compound (c), while stirring, at temperatures between 20 and 100° C., preferably 45 to 70° C. after which the mixture is then allowed to react in the same manner, at these temperatures, with the reaction product (b).

In detail, the method of working when manufacturing the reaction products depends entirely on the reactivity of the monofunctional compounds reaction products (b) or of the functional compounds (c) with the amino groups of the basic polyamides.

The quantity ratios in which the reaction products (b) can be reacted with polyamide (a) can vary within rather wide limits. Suitable products are in general obtained if 2 to 20 amine equivalents of the polyamide (a) are used per 1 mol (2 "reactive equivalents") of the reaction product (b). Fundamentally, however, the quantity ratio should be so chosen within this framework that, taking into account the acid required for neutralization, preferably acetic acid, products which possess good solubility in water are produced. The more reactive is the component (b) or (c), the greater is the danger that the reaction does not take place sufficiently uniformly and that the resulting end product contains considerable proportions of insoluble material which can only be separated off with difficulty. In this case it is advantageous to use larger amounts of polyamide.

Further, the optimum quantity ratio depends on the intended way in which the wool is to be provided with a non-felting finish. In the case of a padding process, the quantity ratio largely plays a subordinate role. In the case of an exhaustion process, the reaction products should however be used in which, for example, not fewer than about 4 amine equivalents of the polyamide are used per 1 mol of the reaction product (b), since otherwise precipitates can form in the bath.

The process for the manufacture of the stable preparations for finishing wool in accordance with the invention is characterised in that the component (a) is reacted with the component (b) in an organic solvent, in the equivalent ratio of 1:1 to 1:5, relative to the amino groups of the component (a) and the epoxide groups of the component (b), to give poly-addition products which are soluble or dispersible in water, and that provision is made, by adding acid not later than after completion of the reaction, that a sample of the reaction mixture, after addition of water, has a pH-value of 2 to 8, preferably 5 to 7.

The reaction takes place in organic solvents which are water-soluble or even miscible with water in all proportions. As examples, there may be mentioned: dioxane, isopropanol, ethanol, methanol, ethylene glycol-n-butyl ether, and di-ethylene glycol-mono-n-butyl ether. In addition it is however also possible to carry out the reaction in water-insoluble organic solvents, for example in hydrocarbons such as petrol, benzene, toluene, or xylene; and halogenated hydrocarbons such as methylene chloride, ethylene chloride, ethylene bromide, s-tetrachlorethane and above all trichlorethylene.

The resulting products are thus in the first place in the form of a solution in an organic solvent. They are sparingly soluble in water or can only be dispersed in water with difficulty, and are additionally strongly basic. The pH-value of the preparation is adjusted to 2–8 by neutralization with an acid, preferably a low molecular aliphatic carboxylic acid, such as formic acid or acetic acid. The products are thus converted into salts which can be dissolved or dispersed in water.

For the finishing, preferably rendering non-felting, of wool, the preparations which are in the form of an organic solution are as a rule diluted to the desired concentration with water-soluble or water-insoluble organic solvents or preferably with water.

Preferably, the wool is finished with the preparations at temperatures of 35 to 100° C. In order to render wool non-felting, the procedure followed is for example that, as one possibility, the wool is impregnated with an aqueous liquor to which the preparation of the reaction product and, if desired, also further additives such as wetting agents and dispersing agents, have been added and that the wool is then dried and subjected to a treatment at elevated temperature. However, the process for dyeing wool and rendering it non-felting in which the wool is successively and in optional sequence, on the one hand dyed according to the exhaustion method and on the other hand treated with the preparations of the reaction products at temperatures of 35 to 100° C. and pH-values of 3 to 9, proves particularly advantageous. Dyeing and rendering non-felting can thereby be combined in a simple manner and carried out in the same apparatus, without the wool being taken out of the apparatus between the two processes.

In carrying out this process, dyeing can be effected in the customary manner which is in itself known, using any desired dyestuffs which can be used for wool, for example acid wool dyestuffs, 1:1 or 1:2 metal complex dyestuffs or reactive dyestuffs. Equally, the additives which are customary when dyeing wool can be employed, such as sulphuric acid, acetic acid, sodium sulphate, ammonium sulphate and levelling agents, possible levelling agents being above all polyglycol compounds of higher aliphatic amines which can optionally also be quaternised and/or esterified at the hydroxyl groups by polybasic acids.

The liquor which serves for the non-felting treatment contains, in addition to the preparation of the reaction product, the acid required for establishing the acid medium. Preferably, however, the process is carried out in the weakly alkaline range of about pH 8 to 9, with ammonia or salts which react alkaline, such as for example trisodium phosphate, being added to the liquor.

Yet other salts such as sodium sulphate, ammonium sulphate or sodium thiosulphate can furthermore be used conjointly, as can also oxidising agents such as hydrogen peroxide.

The amount of reaction product (not including solvents and water), relative to the weight of the wool, is appropriately 0.5 to 5%. As has been mentioned, the process is carried out at temperatures of 35 to 100° C. and for a far-reaching to practically complete fixing of the reaction product between 10 and 80 minutes are mostly required when doing so.

The sequence of the two processes is optional: in general it tends to be advantageous to dye first and then to carry out the non-felting treatment. A dispersing agent, for example a reaction product of naphthalenesulphonic acid and formaldehyde, is advantageously added to the second treatment bath regardless of whether this bath is the dyebath or the bath with the reaction product, and in particular this addition is made first, that is to say before the remaining constituents are added. The combined process for dyeing wool and rendering it non-felting is particularly suited to true machine-dyeing, where the goods being dyed are static and the liquor is agitated.

The preparations of the reaction products are furthermore suitable for use as hair setting agents or as wet strength agents for paper.

Furthermore, finishes using the present reaction products also improve the mechanical properties of the textile material. The reaction products can also be used for the two-dimensional setting ("durable press") of textiles.

In the examples which follow, percentages are percentages by weight.

MANUFACTURING EXAMPLES

EXAMPLE 1

(a) 67.7 g. (0.1 mol) of an 80% strength solution of hexamethylolmelamine-dibutyl and tributyl ether (that is to say a mixture of di- and tri-n-butyl ethers of a highly methylolated melamine) in n-butanol are dissolved in 100 g. of n-butylglycol. 57.3 g. (0.3 epoxide equivalent) of an epoxide formed from 2,2-bis(4'-hydroxyphenyl)-propane and epiclorhydrin, having an epoxide equivalent weight of 191, are then added, and the mixture is warmed to 60° C. for 15 hours. A clear colourless solution is obtained, which is further processed as follows:

(b) 98.8 g. (0.4 amine equivalent) of a condensation product of polymerized linoleic acid and diethylenetriamine, having an amine equivalent weight of 247, are dissolved in 100 g. of n-butylglycol and warmed to 50° C. internal temperature. Thereafter 75 g. of the preparation described under (a) are added dropwise over the course of 20 minutes. After one hour and 40 minutes a sample gives a clear solution in an aqueous solution of acetic acid (10 g. of glacial acetic acid dissolved in 378 g. of water). This solution of 10 g. of glacial acetic acid in 378 g. of water is now added and the mixture is left stirring until cold. A solution of medium viscosity, having a solids content of 20% and a pH of 7.2, is obtained.

EXAMPLE 2

(a) 200 g. of polyethylene glycol with a molecular weight of 4000 are heated for 30 minutes at 200° C. with 31.9 g. (0.167 epoxy equivalent of the epoxide according to Example 1(a), while stirring. A waxy product is obtained.

(b) 116 g. of the product described under (a) are dissolved in 50 g. of n-butylglycol and warmed to 52° C. internal temperature. A solution of 82 g. of a polyamide according to Example 1(b) in 100 g. of n-butylglycol, and 20 g. of glacial acetic acid, are then simultaneously added dropwise over the course of 50 minutes. After 13 hours the mixture is diluted to a solids content of 20.5% with 598 g. of water and stirred until cold. A clear aqueous solution with a pH-value of 6.1 is obtained.

EXAMPLE 3

(a) 191 g. of an epoxide according to Example 1(a) are heated for 30 minutes to 200° C. with 34 g. of pentaerythritol, while stirring.

(b) 98.8 g. of a polyamide according to Example 1(b) are dissolved in 100 g. of butylglycol and warmed to 51° C. internal temperature.

45 g. of the product described under 3(a) and 24 g. of glacial acetic acid are then simultaneously added dropwise over the course of 20 minutes. After 6 hours the mixture is diluted with 324 g. of water to a solids content of 20%, and stirred until cold. A clear solution with a pH of 5.9 is obtained.

EXAMPLE 4

(a) 76.4 g. of epoxide according to Example 1(a) are dissolved in 100 g. of butylglycol and stirred together with 29.6 g. of phthalic anhydride for 9 hours at 80° C. A clear, slightly yellowish solution is obtained.

(b) 98.8 g. of a polyamide according to Example 1(b) are dissolved in 100 g. of butylglycol and warmed to 53° C. internal temperature. 51.4 g. of the product described under 4(a) are then added dropwise over the course of 20 minutes. Thereafter the internal temperature is raised to 100° C. and the mixture is stirred for 24 hours. It is now diluted with 10 g. of glacial acetic acid dissolved in 350 g. of water to a solids content of 20% and left to stir until cold. A clear solution with a pH of 7.2 is obtained.

EXAMPLE 5

(a) 191 g. of an epoxide according to Example 1(a) together with 114 g. of 2,2-bis-(4'-hydroxyphenyl)-propane (0.5 mol) are dissolved in 100 g. of n-butylglycol and stirred for 5½ hours at 80° C.

(b) 98.8 g. of a polyamide according to Example 1(b) are dissolved in 100 g. of n-butylglycol and warmed to 51° C. internal temperature. Thereafter 40.5 g. of the preparation described under 5(a) and 24 g. of glacial acetic acid are simultaneously added dropwise over the course of 30 minutes. After 2 hours a sample gives a clear solution in water. After adding 367 g. of water, the mixture is stirred until cold. A 20% strength clear solution with a pH of 6.0 is obtained.

EXAMPLE 6

(a) 155 g. of an epoxide according to Example 1(a) together with 229 g. of a 51% strength n-butylglycol solution of 2,2-bis-(2'- or 3'-methylol-4'-hydroxyphenyl)-propane are warmed for 6 hours to 80° C. internal temperature.

(b) 98.8 g. of a polyamide according to Example 1(b) are dissolved in 100 g. of n-butylglycol and warmed to 50° C. internal temperature. 47.3 g. of the preparation described under (a), dissolved in 16 g. of n-butylglycol, are then added dropwise over the course of 50 minutes. After 70 minutes the preparation, dissolved in 24 g. of glacial acetic acid, is mixed with 360 g. of water and stirred until cold. A 20% strength clear solution with a pH of 6.0 is obtained.

EXAMPLE 7

(a) 135.5 g. (0.2 mol) of an 80% strength solution of hexamethylolmelamine-dibutyl and -tributyl ether (that is to say a mixture of di- and tri-n-butyl ether of a highly methylolated melamine) in n-butanol are dissolved in 200 g. of n-butylglycol. 57.3 g. (0.3 epoxide equivalent) of the epoxide according to Example 1(a) are then added and the mixture is warmed for 15 hours at 60° C. A clear, colourless solution is obtained.

(b) 58.5 g. of a polyamide according to Example 1(b) are dissolved in 50 g. of n-butylglycol and warmed to 52° C. internal temperature. 65.5 g. of the preparation described under (a) and 12 g. of glacial acetic acid are then simultaneously added dropwise over the course of 20 minutes. After one hour the preparation becomes noticeably more viscous and is now diluted with 232 g. of water. A solution of medium viscosity, having a solids content of 20% and a pH of 5.3, is obtained.

EXAMPLE 8

(a) 67.7 g. (0.1 mol) of an 80% strength solution of hexamethylolmelamine-dibutyl and -tributyl ether (that is to say a mixture of di- and tri-n-butyl ether of a highly methylolated melamine) in n-butanol are dissolved in 150 g. of n-butylglycol. 114.6 g. (0.6 epoxide equivalent) of the epoxide according to Example 1(a) are then added and the mixture is warmed for 15 hours at 60° C. A clear, colourless solution is obtained.

(b) 49.4 g. of a polyamide according to Example 1(b) are dissolved in 50 g. of n-butylglycol and warmed to 50° C. internal temperature. 57.6 g. of the preparation described under (a) are then added dropwise over the course of 30 minutes. After 70 minutes the mixture is diluted with 12 g. of glacial acetic acid dissolved in 224 g. of water. A solution of medium viscosity, having a solids content of 20% and a pH of 5.9 is obtained.

EXAMPLE 9

49.4 g. of a polyamide according to Example 1(b) are dissolved in 50 g. of n-butylglycol and warmed to 50° C. internal temperature. 28.8 g. of the preparation described under 8(a) are then added dropwise over the course of 30 minutes. After 2 hours the mixture is diluted with 12 g. of glacial acetic acid dissolved in 180 g. of water. A 20% strength solution of medium viscosity, with a pH of 6.0, is obtained.

EXAMPLE 10

74.1 g. of a polyamide according to Example 1(b) are dissolved in 74.1 g. of n-butylglycol and warmed to 52° C. internal temperature. 28.8 g. of the preparation described under 8(a) are then added dropwise over the course of 30 minutes. After one hour and 50 minutes the mixture is diluted with 18 g. of glacial acetic acid dissolved in 249 g. of water. A 20% strength solution of medium viscosity, with a pH of 6.0, is obtained.

EXAMPLE 11

98.8 g. of a polyamide according to Example 1(b) are dissolved in 100 g. of n-butylglycol and warmed to 50° C. internal temperature. 28.8 g. of the preparation described under 8(a) are then added dropwise over the course of 40 minutes. After 2 hours the mixture is diluted with 24 g. of glacial acetic acid dissolved in 303 g. of water. A 20% strength solution of medium viscosity, with a pH of 6.0, is obtained.

EXAMPLE 12

(a) 110 g. of an epoxide from 2,2-bis-(4'-hydroxyphenyl)-propane and epichlorhydrin (0.576 epoxide group equivalent) together with 88 g. of polymerized linoleic acid (0.314 acid group equivalent) are warmed for 2 hours to 150° C. internal temperature, while stirring. A highly viscous, clear product with an epoxide group equivalent weight of 600 and an acid number of 0 is obtained.

(b) 98.8 g. (0.4 amine equivalent) of a condensation product of polymerized linoleic acid and diethylenetriamine, with an amine equivalent weight of 247, are dissolved in 100 g. of n-butylglycol and warmed to 52° C. internal temperature. Thereafter a solution of 60 g. of the product described under (a) in 60 g. of n-butylglycol is added dropwise over the course of 40 minutes. After 1 hour and 40 minutes a sample gives a clear solution in glacial acetic acid/water. A solution of 15 g. of glacial acetic acid in 444 g. of deionized water is now added and the mixture is left to stir until cold. A solution of medium viscosity, with a solids content of 20% and a pH-value of 7.0, is obtained.

EXAMPLE 13

(a) 115 g. (0.6 epoxide group equivalent) of an epoxide according to Example 12, together with 120 g. of a hexamethylolmelamine-methyl ether partially esterified with stearic acid (from 1 mol of stearic acid and 1 mol of hexamethylolmelamine-pentamethyl ether) are reacted for 12 hours at 80° C. A waxy product is obtained.

(b) 98.8 g. (0.4 amine equivalent) of a polyamide according to Example 12(b) are dissolved in 90 g. of n-butylglycol and warmed to 50° C. internal temperature. Thereafter a solution of 39.2 g. of the product described under (a), in 39.2 g. of n-butylglycol, is added dropwise over the course of 30 minutes. After 45 minutes, a solution of 12 g. of glacial acetic acid in 393 g. of deionized water is added, and the mixture is left to stir until cold. A solution of medium viscosity having a solids content of 20% and a pH-value of 6.7, is obtained.

EXAMPLE 14

(a) 200 g. of polyethylene glycol with a molecular weight of 4000 are heated for 30 minutes at 200° C. with 31.9 g. (0.167 epoxide group equivalent) of the epoxide according to Example 12(a), while stirring. A waxy product is obtained.

(b) 247 g. of a polyamide according to Example 12(b) are dissolved in 110 g. of n-butylglycol. 13.25 g. of acrylonitrile (0.25 mol) are added thereto and mixture is stirred for 2 hours at 50° C. internal temperature.

(c) 49.8 g. of 0.03 epoxide group equivalent) of the product described under (a) are dissolved in 80 g. of n-butylglycol and warmed to 50° C. internal temperature. Thereafter 44.5 g. of the product described under (b), dissolved in 50 g. of n-butylglycol, are added dropwise over the course of 35 minutes. After 5 hours, 3.6 g. of glacial acetic acid in 166 g. of deionized water are added and the mixture is left to stir until cold. A solution of medium viscostiy, having a solids content of 20% and a pH-value of 7.6, is obtained.

EXAMPLE 15

(a) 286.5 g. (0.75 epoxide group equivalent) of the epoxide according to Example 12(a) together with 7.75 g. (0.25 mol) of ethylene glycol are warmed for 2 hours to 180° C. A clear product of medium viscosity is obtained.

(b) 98.8 g. of a polyamide according to Example 12(b) together with 12.8 g. of benzyl chloride (0.1 mol), are stirred for 2 hours at 100° C.

(c) 111.6 g. of the product described under (b) (0.4 amino group equivalent) are dissolved in 111.6 g. of n-butylglycol and warmed to 60° C. internal temperature.

A solution of 39.2 g. of the product described under (a), dissolved in 40 g. of n-butylglycol, is then added dropwise over the course of 20 minutes. 30 minutes thereafter 12 g. of glacial acetic acid and 420 g. of water are added and the mixture is left to stir until cold. A clear solution is obtained, having a pH-value of 5.8 and a solids content of 20%.

EXAMPLE 16

(a) 135.2 g. (0.2 mol) of an 80% strength solution of hexamethylolmelamine-dibutyl and -tributyl ether (that is to say a mixture of di- and tri-n-butyl ethers of a highly methylolated melamine) in n-butanol are dissolved in 221 g. of n-butylglycol. 140 g. of ethylene glycol diglycidyl ether (1.2 epoxide group equivalent) are then added and the mixture is warmed to 60° C. for 24 hours. A clear, colourless solution is obtained.

(b) 60 g. of (0.242 amino group equivalent) of a polyamide according to Example 1(b) are dissolved in 80 g. of butylglycol and warmed to 59° C. internal temperature. 30 g. of the solution described under (a) are then added dropwise over the course of 30 minutes. 1½ hours thereafter 7.3 g. of glacial acetic acid and 197 g. of deionised water are added and the mixture is left to stir until cold. A clear solution of low viscosity is obtained, having a solids content of 20% and a pH-value of 7.4.

EXAMPLE 17

(a) 98.8 g. of a polyamide according to Example 12(b) (0.4 amino group equivalent) are warmed to 180° C. 20.8 g. of dodecene oxide (0.1 mol) are added dropwise over the course of 2 hours and the mixture is kept at 180° C. for a further 2 hours and then cooled.

(b) 49.8 g. (0.03 epoxide group equivalent) of the product described in Example 14(a) are dissolved in 50 g. of n-butylglycol and warmed to 50° C. 36 g. (0.12 amino group equivalent) of the product described under (a), dissolved in 36 g. of n-butylglycol, are added dropwise over the course of 30 minutes. 3 hours thereafter, 4.3 g. of glacial acetic acid and 246 g. of deionised water are added and the mixture is left to stir until cold. A clear solution of low viscosity is obtained, having a solids content of 20% and a pH-value of 7.0.

EXAMPLE 18

(a) 187 g. of polymerized fatty acid and 68.5 g. of diethylenetriamine are introduced into a reaction vessel provided with a stirrer, a thermometer, an inlet tube for nitrogen and a distillation head. The polymerized fatty acid, obtained by polymerization of oleic acid, has the following properties: 95% dimerised oleic acid; equivalent weight 289.

The reaction mixture is heated to 200° C. over the course of 1½ hours under a nitrogen atmosphere and while stirring, with the elimination of water starting at 160° C. internal temperature. After a further 2 hours at 200° C., a total of 13 parts of water are collected.

Thereafter the mixture is concentrated in vacuo (14 mm. Hg) at 200 to 210° C. for 3 hours. 210 g. of a viscous, yellowish, clear product having an amine equivalent weight of 400 are obtained.

(b) 80 g. of the condensation product described under (a) (0.2 amino group equivalent) are dissolved in 90 g. of n-butyl-glycol and warmed together with 11.1 g. of the product described in Example 15(a) to 60° C. for 1 hour. 7 g. of glacial acetic acid and 262 g. of deionized water are thereafter added and the mixture is left to stir until cold.

A clear solution of low viscosity is obtained, having a pH-value of 8 and a solids content of 20%.

EXAMPLE 19

48 g. of the product described in Example 18(a) are dissolved in 54 g. of n-butylglycol and stirred, together with 6.66 g. of the product described in Example 15(a), for 1 hour at 60° C. 6 g. of glacial acetic acid and 155 g. of butylglycol are then added and the mixture is left to stir until cold. A clear solution of low viscosity and of 20% solids content is obtained.

EXAMPLE 20

(a) 135.2 g. (0.2 mol) of an 80% strength solution of hexamethylolmelamine-dibutyl and -tributyl ether (that is to say a mixture of di- and tri-n-butyl ethers of a highly methylolated melamine) in n-butanol are dissolved in 200 g. of dioxane. 65.4 g. of triglycidyl isocyanurate (0.6 epoxide group equivalent) are then added and the mixture is warmed to 60° C. for 2 hours.

(b) 37.1 g. (0.15 amino group equivalent) of a polyamide according to Example 12(b) are dissolved in 60 g. of n-butylglycol and warmed to 60° C. internal temperature. 33.3 g. of the solution described under a) are then added dropwise over the course of 30 minutes. 2 hours thereafter 4.5 g. of glacial acetic acid and 128 g. of water are added and the mixture is left to stir until cold. A solution of medium viscosity is obtained, having a solids content of 20% and a pH-value of 7.0.

EXAMPLE 21

(a) 247.5 g. of hexahydrophthalic acid diglycidyl ester with an epoxide equivalent weight of 165, together with 15.5 g. of ethylene glycol (0.25 mol), are warmed for 2 hours to 180° C. internal temperature.

(b) 49.4 g. (0.2 amino group equivalent) of a polyamide according to Example 12(b) are dissolved in 60 g. of n-butyl-glycol and warmed to 60° C. internal temperature. A solution of 19.3 g. of the product described under (a) (0.05 epoxide group equivalent) in 40 g. of butylglycol is then added dropwise over the course of 30 minutes. 45 minutes thereafter 8 g. of glacial acetic acid and 159 g. of deionized water are added and the mixture is left to stir until cold. A clear solution of low viscosity is obtained, having a solids content of 20% and a pH-value of 6.8.

EXAMPLE 22

(a) 241.5 g. (1.9 epoxide group equivalent) of an epoxide of formula

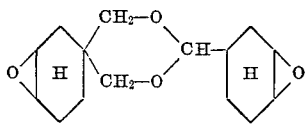

(2)

together with 26.5 g. of diethylene glycol (0.25 mol) are warmed for 2 hours to 180° C. internal temperature.

(b) 98.8 g. (0.4 amino group equivalent) of a polyamide according to Example 12(b) together with 28.4 g. of stearic acid (0.1 mol) are warmed for 3 hours to 160° C.

(c) 53 g. of the product described under (b) are dissolved in 53 g. of n-butylglycol and warmed to 60° C. internal temperature. A solution of 6.2 g. of the epoxide described under (a) in 20 g. of n-butylglycol is then added dropwise over the course of 30 minutes. 40 minutes thereafter 5 g. of glacial acetic acid and 150 g. of water are added and the mixture is left to stir until cold. A clear solution of low viscosity, having a solids content of 20% and a pH-value of 6.6, is obtained.

EXAMPLE 23

(a) 191 g. of an epoxy from 2,2-bis-(4'-hydroxyphenyl)-propane and epichlorhydrin (1 epoxide equivalent) are warmed for 2 hours to 150° C. internal temperature with 81 g. of sebacic acid (0.8 acid group equivalent) while stirring. A highly viscous product with an epoxide group equivalent weight of 1320 and an acid number of 4.3 is obtained.

(b) 39.6 g. (0.16 amino group equivalent) of a condensation product of polymerized linoleic acid and diethylenetriamine, with an amine equivalent weight of 247, are dissolved in 100 g. of n-butylglycol and warmed to 60° C. internal temperature. Thereafter 54.4 g. of the product described under (a), dissolved in 54.4 g. of n-butylglycol (0.04 epoxide group equivalent) are added dropwise over the course of 30 minutes. After 75 minutes 10.8 g. of glacial acetic acid and 217 g. of water are added and the mixture is further stirred until cold. A clear solution of low viscosity, having a solids content of 20% and a pH-value of 5.8, is obtained.

USE EXAMPLES

EXAMPLE 1

100 kg. of pure wool yarn in hank form are uniformly packed into a package apparatus. This yarn is first dyed in the customary manner with reactive dyestuffs or other very fast dyestuffs. Thereafter it is rinsed and a fresh treatment bath is prepared at 50° C.

11 kg. of the preparation according to Manufacturing Example 1(b) are first added to this bath. After distributing this preparation, 4 kg. of disodium phosphate, dissolved in 20 litres of water, are added over the course of 5 minutes. Immediately thereafter 4 kg. of trisodium phosphate, dissolved in 20 litres of water, are run in over the course of 10 minutes in the same manner. After a further 15 minutes the goods are thoroughly rinsed, centrifuged and dried for one hour at 60 to 80° C. The yarn is to be described as non-felting according to Specification 7B of the IWS.

Similar results are also achieved with the preparations of Manufacturing Examples 2 to 11.

EXAMPLE 2

100 kg. of woven wool fabric are dyed in the customary manner in a winch apparatus with reactive dyestuffs suitable for wool. After a thorough rinsing, a fresh treatment bath of 4000 litres is prepared at 40° C.

8 kg. of the preparation according to Manufacturing Example 22 are added to this treatment bath and thereafter 2200 g. of ammonia (25%) diluted to 10 litres with water are run in over the course of 15 minutes. A stable emulsion forms in the treatment bath and is absorbed by the wool in 30 minutes. When the treatment bath is practically exhausted, 20 litres of hydrogen peroxide (33% strength) are further added and the treatment is continued for 15 minutes. Finally, 2 kg. of a condensation product of 1 mol of octadecyl alcohol and 35 mols of ethylene oxide are still added and the goods are treated for 10 minutes and then thoroughly rinsed twice. After drying, the yarn is non-felting according to IWS Specification 7b or 7c.

Similar results are also achieved with the preparations according to Manufacturing Examples 12 to 18 and 20 to 22.

EXAMPLE 3

A woven wool fabric is impregnated with the following preparation and then squeezed out to a liquor uptake of 100%: 900 parts of tetrachlorethylene and 100 parts of a preparation according to Manufacturing Example 19. Thereafter the fabric is dried. The fabric is non-felting according to IWS Specification 7b or 7c, as well as 71.

We claim:

1. A composition comprising the reaction product of (A) basic polyamides obtained by condensation of polymeric, unsaturated fatty acids with polyalkylene-polyamines and (B) products obtained by reaction of 1.5 to 6 mols of an epoxide containing at least 2 epoxide groups per molecule with 1 mol of a compound selected from the group consisting of an aminoplast precondensate containing alkyl ether groups, an aliphatic polyhydric alcohol, an aromatic polyhydric alcohol, an aliphatic dicarboxylic acid, an aromatic dicarboxylic acid, an anhydride of an aliphatic dicarboxylic acid and an anhydride of an aromatic dicarboxylic acid, the equivalent ratio of the amino groups of component (A) to the epoxide groups of component (B) being 1:1 to 5:1 and the pH value of the reaction mixture components (A) and (B) having been adjusted to a value of 2 to 8 not later than after completion of the reaction.

2. A composition according to claim 1 characterised in that the unsaturated fatty acid of component (A) is dimeric to trimeric unsaturated fatty acid.

3. A composition according to claim 1 characterised in that component (A) is a polyamide of dimerized to trimerized linoleic or linolenic acid and a polyamide of formula

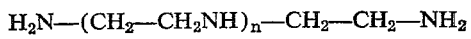

wherein $n$ is 1, 2 or 3.

4. A composition according to claim 1 characterized in that the epoxide reactant of (B) is a bisphenol.

5. A composition according to claim 1 characterized in that the non-epoxide reactant of (B) is an alkylether of methylolaminotriazine, a polyethylene glycol, a polyalkanol, a bisphenol or a benzenedicarboxylic acid anhydride.

6. A composition according to claim 5 characterised in that the non-epoxide reactant of a component (B) is an alkyl ether of highly methylolated melamine, of which the alkyl radicals contain at most 4 carbon atoms.

7. A composition according to claim 6 characterised in that the alkyl ether is an alkyl either of penta- to hexamethylolmelamine, of which the alkyl radicals contain at most 4 carbon atoms.

8. A composition comprising water and the composition of claim 1.

9. An organic solution of the composition of claim 1.

10. A composition according to claim 6 characterised in that the alkyl ether is a di- to tributylether of hexamethylolmelamine.

11. Process for the manufacture of compositions according to claim 1 which conprises reacting components (A) and (B) in an organic solvent, to give polyaddition compounds which are soluble or dispersible in water, with the equivalent ratio of the amino groups of the component (A) to the epoxide groups of the component (B) being 1:1 to 5:1 and adding sufficient acid not later than after completion of the reaction, that a sample of the reaction mixture, after addition of water, possesses a pH-value of 2 to 8.

References Cited
UNITED STATES PATENTS

| | | | |
|---|---|---|---|
| 2,933,409 | 4/1960 | Binkley et al. | 260—18 |
| 2,990,383 | 6/1961 | Glaser | 260—18 |
| 3,019,076 | 1/1962 | Pardo et al. | 8—128 |
| 3,219,602 | 11/1965 | Scheibli | 260—18 |
| 3,306,865 | 2/1967 | Wheeler et al. | 260—21 |
| 3,367,991 | 2/1968 | Hicks | 260—21 |
| 3,468,704 | 9/1969 | Graver | 260—18 |

HOSEA E. TAYLOR, Primary Examiner

R. W. GRIFFIN, Assistant Examiner

U.S. Cl. X.R.

8—128 A; 117—141; 260—18 EP, 29.2 EP, 29.2 N, 29.4